United States Patent
Wu et al.

(10) Patent No.: US 8,041,451 B2
(45) Date of Patent: Oct. 18, 2011

(54) METHOD FOR BIN-BASED CONTROL

(75) Inventors: Sunny Wu, Zhudong Town (TW); Chih-Sheng Shih, Jhubei (TW); Andy Tsen, Chung-Ho (TW); Jo Fei Wang, Hsin-Chu (TW); Jong-I Mou, Hsinpu Township, Hsinchu County (TW); Hsin Kuan, Hsinchu (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 359 days.

(21) Appl. No.: 12/427,154

(22) Filed: Apr. 21, 2009

(65) Prior Publication Data

US 2010/0268367 A1   Oct. 21, 2010

(51) Int. Cl.
  *G06F 7/00* (2006.01)
  *G06F 19/00* (2006.01)
  *G06F 17/00* (2006.01)
  *G06Q 10/00* (2006.01)

(52) U.S. Cl. ........ 700/216; 700/106; 700/121; 700/241; 700/242; 700/244; 705/28

(58) Field of Classification Search ............ 700/97, 700/106, 107, 121, 213–216, 231, 232, 236, 700/241, 242, 244; 705/7.11, 7.12, 7.22, 705/7.23, 7.25, 22, 26.1, 26.8–26.82, 28, 705/29; 221/9–11; 222/52; 235/385
See application file for complete search history.

(56) References Cited

U.S. PATENT DOCUMENTS

| | | | |
|---|---|---|---|
| 4,542,808 A * | 9/1985 | Lloyd et al. | 186/56 |
| 5,608,643 A * | 3/1997 | Wichter et al. | 700/244 |
| 6,055,463 A | 4/2000 | Cheong et al. | |
| 6,223,098 B1 | 4/2001 | Cheong et al. | |
| 6,266,595 B1 * | 7/2001 | Greatline et al. | 701/50 |
| 6,594,535 B1 * | 7/2003 | Costanza | 700/97 |
| 6,778,872 B2 * | 8/2004 | Jorgenson et al. | 700/106 |
| 7,107,113 B1 * | 9/2006 | Morenz et al. | 700/106 |
| 7,650,297 B1 * | 1/2010 | Baker et al. | 705/28 |
| 7,653,457 B2 * | 1/2010 | Bloom | 700/226 |
| 7,894,932 B2 * | 2/2011 | Mountz et al. | 700/214 |
| 2005/0004682 A1 * | 1/2005 | Gaddis et al. | 700/9 |
| 2006/0173750 A1 * | 8/2006 | Naley et al. | 705/26 |
| 2007/0203811 A1 * | 8/2007 | Hoopes et al. | 705/28 |
| 2008/0027835 A1 * | 1/2008 | LeMasters et al. | 705/28 |
| 2008/0120205 A1 * | 5/2008 | Hoopes et al. | 705/28 |
| 2008/0183327 A1 * | 7/2008 | Danelski | 700/216 |
| 2008/0183599 A1 * | 7/2008 | Hill et al. | 705/28 |
| 2008/0215179 A1 * | 9/2008 | Yair et al. | 700/215 |
| 2008/0243646 A1 * | 10/2008 | Stein et al. | 705/28 |
| 2008/0294527 A1 * | 11/2008 | Alfandary et al. | 705/22 |
| 2009/0192837 A1 * | 7/2009 | Templer et al. | 705/7 |

* cited by examiner

*Primary Examiner* — Crystal J Barnes-Bullock
(74) *Attorney, Agent, or Firm* — Haynes and Boone, LLP (57) ABSTRACT

A method for providing bin-based control when manufacturing integrated circuit devices is disclosed. The method comprises performing a plurality of processes on a plurality of wafer lots; determining a required bin quantity, an actual bin quantity, and a projected bin quantity; comparing the determined required bin quantity with the determined actual bin quantity and determined projected bin quantity; and modifying at least one of the plurality of processes on the plurality of wafer lots if the determined actual bin quantity and determined projected bin quantity fail to satisfy the determined required bin quantity.

21 Claims, 7 Drawing Sheets

METHOD FOR BIN-BASED CONTROL

BACKGROUND

The semiconductor integrated circuit (IC) industry has experienced rapid growth. Conventional processing of IC devices involves processing one or more wafer lots, each wafer lot including one or more wafers. The wafers are eventually cut into a plurality of dies, and each die contains a complete IC device. The IC devices of a wafer lot may exhibit varying IC characteristics, so the dies are classified into various bin categories (i.e., BIN 1, BIN 2, BIN 3, . . . etc.). For example, IC devices classified as BIN 1 (i.e., bin category 1) may have experienced no failures and are thus regarded as good or passed devices, while IC devices classified as BIN 3 (i.e., bin category 3) are regarded as defective. Each wafer lot may be characterized by a bin ratio, which represents the ratio and/or percentage of the lot exhibiting IC characteristics associated with each bin category. A customer often specifies particular IC characteristics when ordering IC devices, thus a customer's order is associated with a particular bin category. Current semiconductor manufacturing systems lack the ability to effectively control bin category quantities and dynamically meet customer bin demand. This especially poses a problem when urgent delivery requests are received.

Accordingly, what is needed is a method and system that addresses the above stated issues.

SUMMARY

A method for providing bin-based control is provided. In one embodiment, the method includes performing a plurality of processes on a plurality of wafer lots; determining a required bin quantity, an actual bin quantity, and a projected bin quantity; comparing the determined required bin quantity with the determined actual bin quantity and determined projected bin quantity; and modifying at least one of the plurality of processes on the plurality of wafer lots if the determined actual bin quantity and determined projected bin quantity fail to satisfy the determined required bin quantity.

In one embodiment, a method for fabricating integrated circuit devices is provided. The method includes determining a required bin quantity including a required delivery date and a deliverable bin quantity; calculating a bin quantity per processing lot if a first gap exists between the deliverable bin quantity and the required bin quantity; designating at least one of the processing lots for ship-out to fill the first gap; determining a required cycle time for the designated processing lot; and modifying a processing parameter of the designated processing lot if the required cycle time does not meet the required delivery date.

In one embodiment, a system for providing bin-based control in a semiconductor manufacturing environment in which a plurality of processes are performed on a plurality of wafer lots is provided. The system includes a virtual fabrication system coupled to a network; a manufacturing execution system (MES) coupled to the network, wherein the MES comprises a bin-based control module configured to determine a required bin quantity, an actual bin quantity, and a projected bin quantity; compare the determined required bin quantity with the determined actual bin quantity and determined projected bin quantity; and modify at least one of the plurality of processes on the plurality of wafer lots if the determined actual bin quantity and determined projected bin quantity fail to satisfy the determined required bin quantity.

BRIEF DESCRIPTION OF THE DRAWINGS

The present disclosure is best understood from the following detailed description when read with the accompanying figures. It is emphasized that, in accordance with the standard practice in the industry, various features are not drawn to scale and are used for illustration purposes only. In fact, the dimensions of the various features may be arbitrarily increased or reduced for clarity of discussion.

DETAILED DESCRIPTION

The present disclosure relates generally to semiconductor fabrication systems, and more particularly, to a semiconductor fabrication system and method for providing bin-based control.

It is understood that the following disclosure provides many different embodiments, or examples, for implementing different features of the invention. Specific examples of components and arrangements are described below to simplify the present disclosure. In addition, the present disclosure may repeat reference numerals and/or letters in the various examples. This repetition is for the purpose of simplicity and clarity and does not in itself dictate a relationship between the various embodiments and/or configurations discussed.

Figure 1:
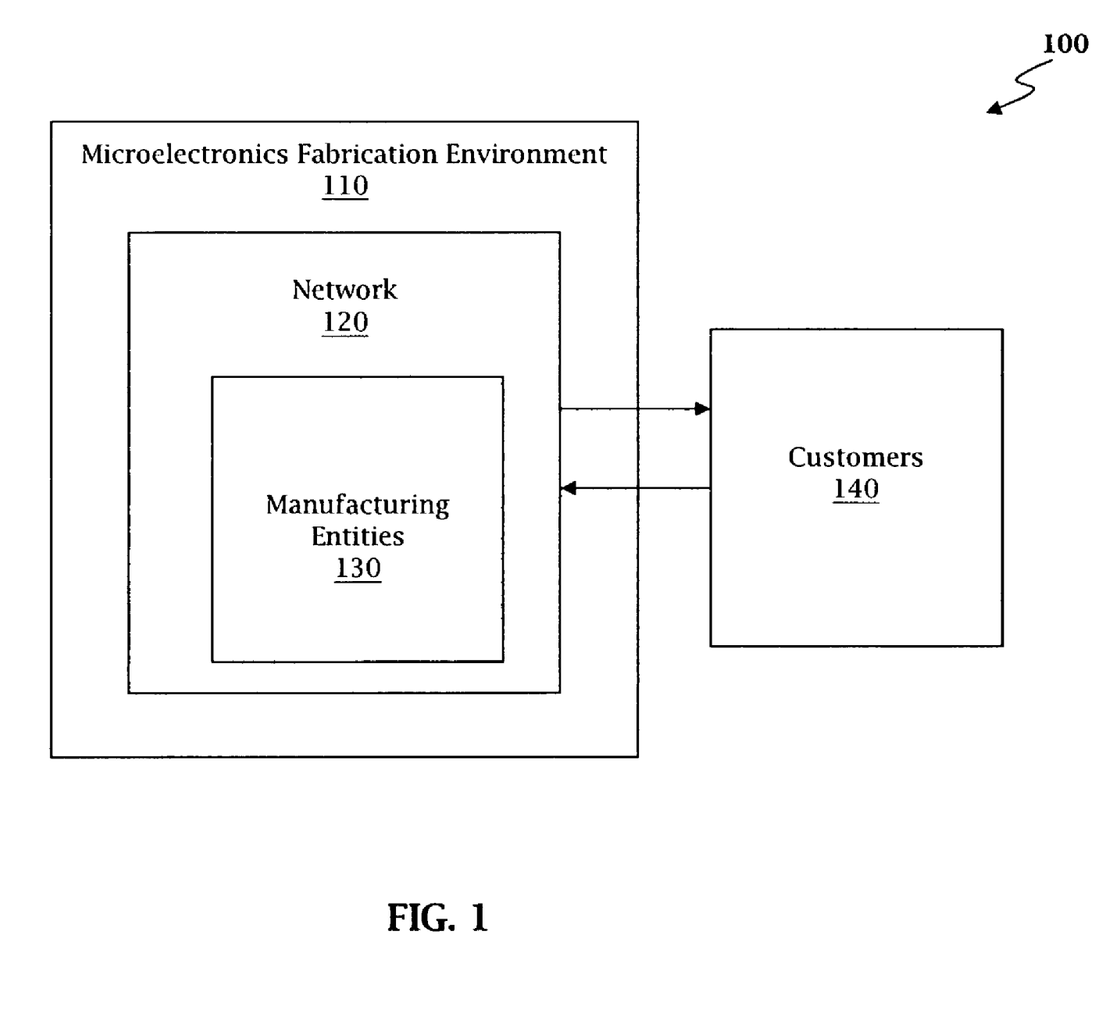
FIG. 1 is a block diagram of a system in which various embodiments disclosed herein are implemented.

FIG. 1 illustrates a schematic view of one embodiment of a system 100 constructed according to aspects of the present disclosure. The system 100 includes a microelectronics fabrication environment 110, a network 120, and a plurality of manufacturing entities 130. A plurality of customers 140 can be in communication with the microelectronics fabrication environment 110. The microelectronics fabrication environment 110 includes a microelectronics foundry business. The foundry business includes a myriad of manufacturing facilities for the fabrication of a variety of different microelectronics products. For example, there may be at least one manufacturing facility for the front end fabrication of a plurality of microelectronics products (i.e., front-end-of-line (FEOL) fabrication), while a second manufacturing facility may provide the back end fabrication for the packaging of the microelectronics products (i.e., back-end-of-line (BEOL) fabrication), and a third manufacturing facility may provide other services for the foundry business. The foundry business may further include an unlimited number of fabrication facilities interconnected through the network 120.

The network 120 includes a plurality of interconnecting nodes for the communication of manufacturing information. The information may include a plurality of message databases for the control and extraction of information from the manufacturing entities 130. The plurality of manufacturing entities 130 include a plurality of manufacturing process tools, metrology tools, customer interfaces, design databases, a manufacturing executing system (MES), and other entities associated with the microelectronics fabrication environment 110. The network 120 may further include wired and/or wireless interconnections. The network 120 provides interconnection between manufacturing facilities of the microelectronics fabrication environment 110. The network 120 further provides interconnection between the manufacturing fabrication environment 110 and the plurality of customers 140.

Figure 2:
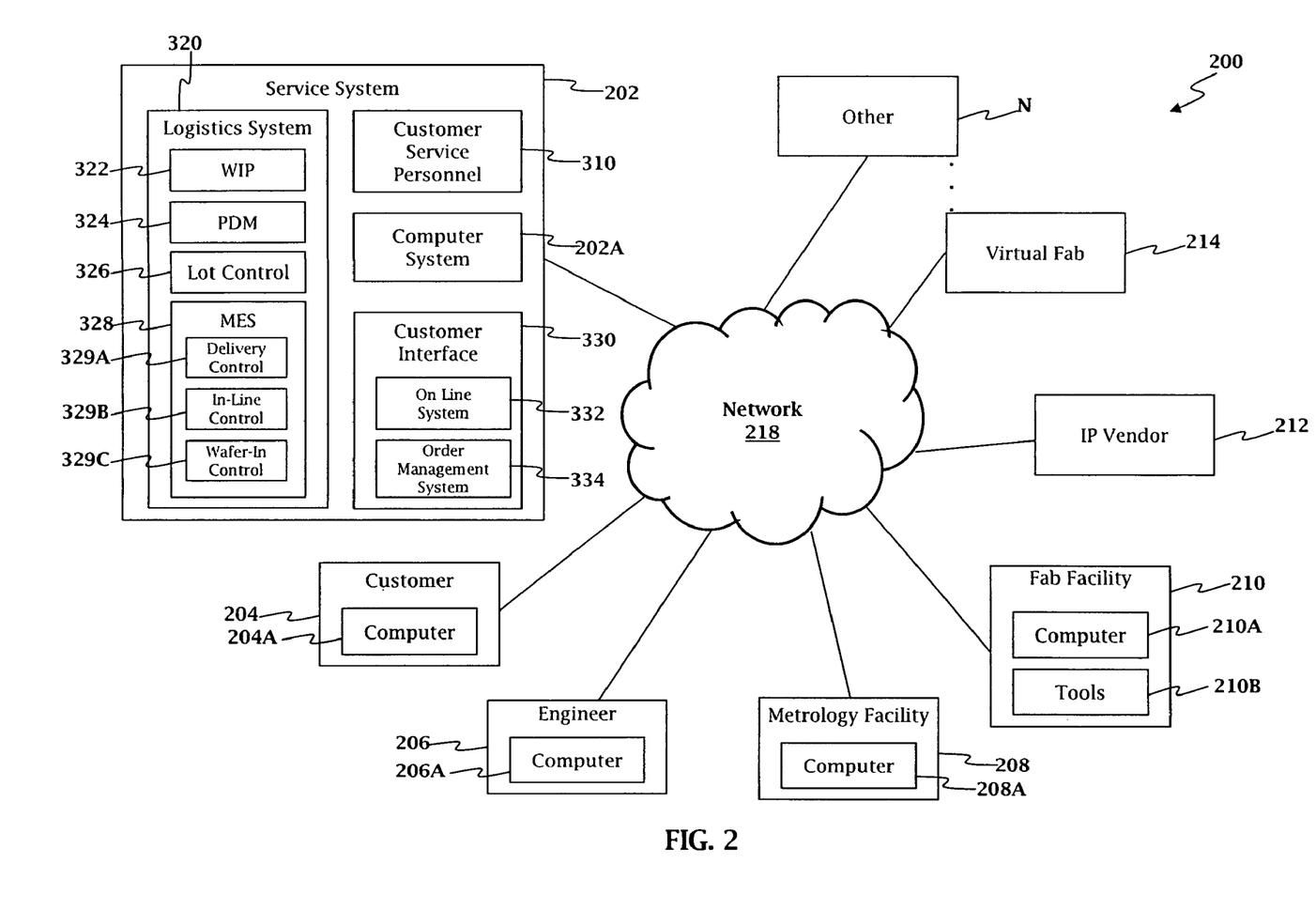
FIG. 2 is a block diagram of a virtual IC fabrication system in which various embodiments disclosed herein are implemented.

Referring to FIG. 2, a virtual IC fabrication system (a "virtual fab") 200 is illustrated, within which the methodology associated with system 100 of FIG. 1 may be practiced. The virtual fab 200 includes a plurality of entities 202, 204, 206, 208, 210, 212, 214 . . . , N that may be connected by a communications network 218. The network 218 may be a single network, or may be a variety of different networks, such as an intranet and the Internet. The network 218 may include both wireline and wireless communication channels. In some embodiments, the network 218 is similar to the network 120 described above.

The virtual fab 200 enables interaction among the entities 202-216 for the purpose of IC manufacturing, as well as the provision of services. For example, IC manufacturing includes receiving a customer's IC order, performing the associated operations needed to produce the ordered ICs, and sending the ordered ICs to the customer, such as the design, fabrication, testing, and shipping of the ICs. In the present embodiment, the entity 202 represents a service system for service collaboration and provision, the entity 204 represents a customer, the entity 206 represents an engineer, the entity 208 represents a metrology facility (or tool) for IC testing and measurement, the entity 210 represents a fabrication (fab) facility, the entity 212 represents an IC design intellectual properties (IP) vendor, and the entity 214 represents another virtual fab (e.g., a virtual fab belonging to a subsidiary or a business partner). Each entity may interact with other entities and may provide services to and/or receive services from the other entities.

For purposes of illustration, each entity 202-214 may be referred to as an internal entity (e.g., an engineer, customer service personnel, an automated system process, a design or fabrication facility, fab-related facilities (e.g., raw-materials, shipping, assembly or test), etc.) that forms a portion of the virtual fab 200 or may be referred to as an external entity (e.g., a customer, IP vendor, design provider, etc.) that interacts with the virtual fab 200. The internal entities may be directly responsible for producing the end product, such as a wafer or individually tested IC device. The external entities may be facilities not directly associated or under the control of the fab. It is understood that the entities 202-214 may be concentrated at a single location or may be distributed, and that some entities may be incorporated into other entities. In addition, each entity 202-214 may be associated with system identification information that allows access to information within the system to be controlled based upon authority levels associated with each entity's identification information.

Each of the entities 202-214 may include one or more computing devices, such as a personal computer, personal digital assistant, pager, cellular telephone, other suitable computing device, and/or combinations thereof. For example, entities 202, 204, 206, 208, and 210 comprise computer systems and/or computers 202A, 204A, 206A, 208A, and 210A. The computing devices may comprises a central processing unit (CPU), a memory unit, an input/output (I/O) device, and a network interface. Such components may be interconnected by a bus system. It is understood that the computer system may be differently configured and that each of the listed components represent several different components. For example, the CPU may include a multi-processor or a distributed processing system; the memory unit may include different levels of cache memory, main memory, hard disks, and remote storage locations; the I/O device may include monitors and keyboards; and the network interface may be a modem, a wireless transceiver, and/or one or more network interface cards.

The computing devices or systems may be connected to a network, which may be further connected to the network 218. The network may be, for example, a complete network or a subnet of a local area network, a company wide intranet, and/or the Internet. The computing devices may be identified on the network by an address or a combination of addresses, such as a media access control (MAC) address associated with the network interface and an internet protocol (IP) address. Because the computing devices may be connected to the network, certain components may, at times, be shared with other devices. Therefore, a wide range of flexibility is anticipated in the configuration of the computing devices. In some embodiments, the computing devices may act as a server to other devices.

One of the services provided by the virtual fab 200 may enable collaboration and information access in such areas as design, engineering, logistics, and material control. For example, in the design area, the customer 204 may be given access to information and tools related to the design of their product via the service system 202. The tools may enable the customer 204 to perform yield enhancement analysis, view layout information, and obtain similar information. In the engineering area, the engineer 206 may collaborate with other engineers using fabrication information regarding pilot yield runs, risk analysis, quality, and reliability. The logistics area may provide the customer 204 with fabrication status, testing results, order handling, and shipping dates. It is understood that these areas are exemplary, and that more or less information may be made available via the virtual fab 200 as desired. Another service provided by the virtual fab 200 may integrate systems between facilities, such as between the metrology facility 208 and the fab facility 210. Such integration enables facilities to coordinate their activities. For example, integrating the metrology facility 208, fab facility 210, and IP vendor 212, may enable manufacturing (and/or design) information to be incorporated more efficiently into the fabrication process, and may enable data from the metrology tools to be returned to the fab facility 210 for improvement and incorporation.

The service system 202 provides an interface between the customer (e.g., a customer's internal system, such as a computer database) and the IC manufacturing operations, which can include IC fabrication, process control, equipment maintenance, production control, quality and reliability, testing and shipping, customer order system, business management, and financial information. The service system 202 may include customer service personnel 310, a logistics system 320 for order handling and tracking, and a customer interface 330 for enabling a customer to directly access various aspects of an order. The service system 202 may also provide such services as identification validation and access control, both to prevent unauthorized users from accessing data and to ensure that an authorized customer may access only their own data.

The logistics system 320 may include a work-in-process (WIP) inventory system 322, a product data management (PDM) system 324, a lot control system 326, and a manufacturing execution system (MES) 328 having a bin-based control system including a delivery control 329A, an in-line control 329B, and a wafer-in control 329C (collectively referred to as bin-based control system 329). The WIP inventory system 322 may track working lots using a database. The PDM system 324 may manage product data and maintain a product database. The product database could include product categories (e.g., part, part numbers, and associated information), as well as a set of process stages that are associated with each category of products. The lot control system 326 may convert a process stage to its corresponding process steps.

The MES 328 may be an integrated computer system representing the methods and tools used to accomplish production. In the present example, the primary functions of the MES 328 may include collecting data in real time, organizing and storing the data in a centralized database, work order management, workstation management, process management, inventory tracking, and document control. The MES 328 may be connected to other systems both within the service system 202 and outside of the service system 202. Examples of MES systems 328 include Promis™ (a product of Brooks Automation Inc. of Massachusetts), Workstream™ (a product of Applied Materials, Inc. of California), Poseidon™ (a product of IBM Corporation of New York), and Mirl-MES™ (a product of Mechanical Industry Research Laboratories of Taiwan). Each MES may have a different application area. For example, Mirl-MES may be used in applications involving packaging, liquid crystal displays (LCDs), and printed circuit boards (PCBs), while Promis, Workstream, and Poseidon may be used for IC fabrication and thin film transistor LCD (TFT-LCD) applications. The MES 328 may include such information as a process step sequence for each product.

In the present embodiment, the MES 328 comprises a bin-based control system 329, which will be described in more detail below. The bin-based control system 329 includes the delivery control 329A, in-line control 329B, and wafer-in control 329C. The delivery, in-line, and wafer-in controls 329A, 329B, 329C can comprise software to implement controlling and have an ability to handle multiple tasks simultaneously and dynamically. The delivery, in-line, and wafer-in controls 329A, 329B, 329C can include hardware, including a computer, a network, and/or an interface to bridge communication between one another, the entities of system 200, a manufacturing execution system (MES), a computer integrated manufacturing system (CIM), an automatic material handling system (AMHS), a virtual fab, other suitable systems, and/or combinations thereof. As further discussed below, the bin-based control system 329 provides the ability to dynamically control and manage bin quantities and/or demand.

The customer interface 330 may include an online system 332 and an order management system 334. The online system 332 may function as an interface to communicate with the customer 204, other systems within the service system 202, supporting databases, and other entities 206-216. The order management system 334 may manage client orders and may be associated with a supporting database to maintain client information and associated order information.

The customer 204 may obtain information about the manufacturing of its ICs via the virtual fab 200 using the computer system 204A. In the present example, the customer 204 may access the various entities 202, 206-214 of the virtual fab 200 through the customer interface 330 provided by the service system 202. However, in some situations, it may be desirable to enable the customer 204 to access other entities without going through the customer interface 330. For example, the customer 204 may directly access the fab facility 210 to obtain fabrication related data.

The engineer 206 may collaborate in the IC manufacturing process with other entities of the virtual fab 300 using the computer system 206A. The virtual fab 200 enables the engineer 206 to collaborate with other engineers and a design/lab facility in IC design and testing, to monitor fabrication processes at the fab facility 210, and to obtain information regarding test runs, yields, etc. In some embodiments, the engineer 206 may communicate directly with the customer 204 via the virtual fab 200 to address design issues and other concerns.

The metrology tool 208 (and/or design/lab facility) provides IC design and testing services that may be accessed by other entities via the virtual fab 200. The metrology tool 208 may include electrical, optical, and/or analytical tools, such as microscopes, micro-analytical tools, line width measurement tools, mask and reticle defect tools, particle distribution tools, surface analysis tools, stress analysis tools, resistivity and contact resistance measurement tools, mobility and carrier concentration measurement tools, junction depth measurement tools, film thickness tools, gate oxide integrity test tools, C-V measurement tools, focused ion beam (FIB), and other test and measurement tools. The wafer data may include wafer results such as wafer parameters measured by the metrology tools, such as sheet resistance, reflectivity, stress, particle density, and critical dimension. The wafer data may also comprise other data, such as wafer ID and product type.

The fab facility 210 enables the fabrication of IC devices. Control of various aspects of the fabrication process, as well as data collected during the fabrication process, may be accessed via the virtual fab 200. The fab facility 210 may include the computer system 210A and various fabrication hardware and software tools and manufacturing equipment 210B. For example, the fab facility 210 may include an ion implantation tool, a chemical vapor deposition tool, a thermal oxidation tool, a sputtering tool, and various optical imaging systems, metrology tools, as well as the software needed to control these components. The fab facility 210 may comprise one or more systems and/or tools, such as a chemical vapor deposition system, a physical vapor deposition (PVD) system, an etching system, a thermal oxidation system, an ion implantation system, a chemical mechanical polishing system, a rapid thermal annealing system, a photolithography system, other semiconductor fabrication tools, and/or combinations thereof. The system/tool data may include setting values of hardware parameters (or hardware parameter setting data). For example, considering a PVD system, the hardware parameters may include heater temperature, wafer temperature, radio frequency (RF) bias reflected power, RF side reflected power, RF top reflected power, chamber pressure, gas partial pressures, and chuck voltage. The hardware parameters may comprise other parameters not included in a process recipe such as sputtering target thickness and spacing between the target and the wafer for the PVD tool. The system/tool data may further comprise other data, such as tool ID, tool maintenance history, and material specification (like a sputtering target material used in the PVD tool).

As an example, a wafer, either individually or in batch, is processed through various process steps. One process step may be performed in the fab facility 210. Other process steps may be performed in other fabrication tools. The fab facility 210 may be programmed, set, and configured according to a process recipe when the wafer is processed therein. The process recipe may define a plurality of sub-steps. For example, a PVD tool recipe may define the following sub-steps: gas, ramp, stabilization, deposition, and pump-down. Each sub-step may be defined with a certain time duration and may set various hardware parameters to certain levels. After the wafer completes the process step in the fabrication tool according to the process recipe, one or more of the metrology tools 208 may be utilized to test and measure the wafer to get wafer results. The manufacturing data, including wafer data and tool data, may be collected from the metrology tools 208 and the fab facility 210, respectively.

The IP vendor 212 may represent any vendor who provides design IP service including design tools and/or a design library of building blocks, such as standard cell, technical documents, and reference flow.

It is understood that the entities 202-214 of the virtual fab 200, as well as their described interconnections, are for illustration purposes only. Further, it is envisioned that more or fewer entities, both internal and external, may exist within the virtual fab 200, and that some entities may be incorporated into other entities or distributed. For example, the service system 202 may be distributed among the various entities 206-214.

Figure 3:
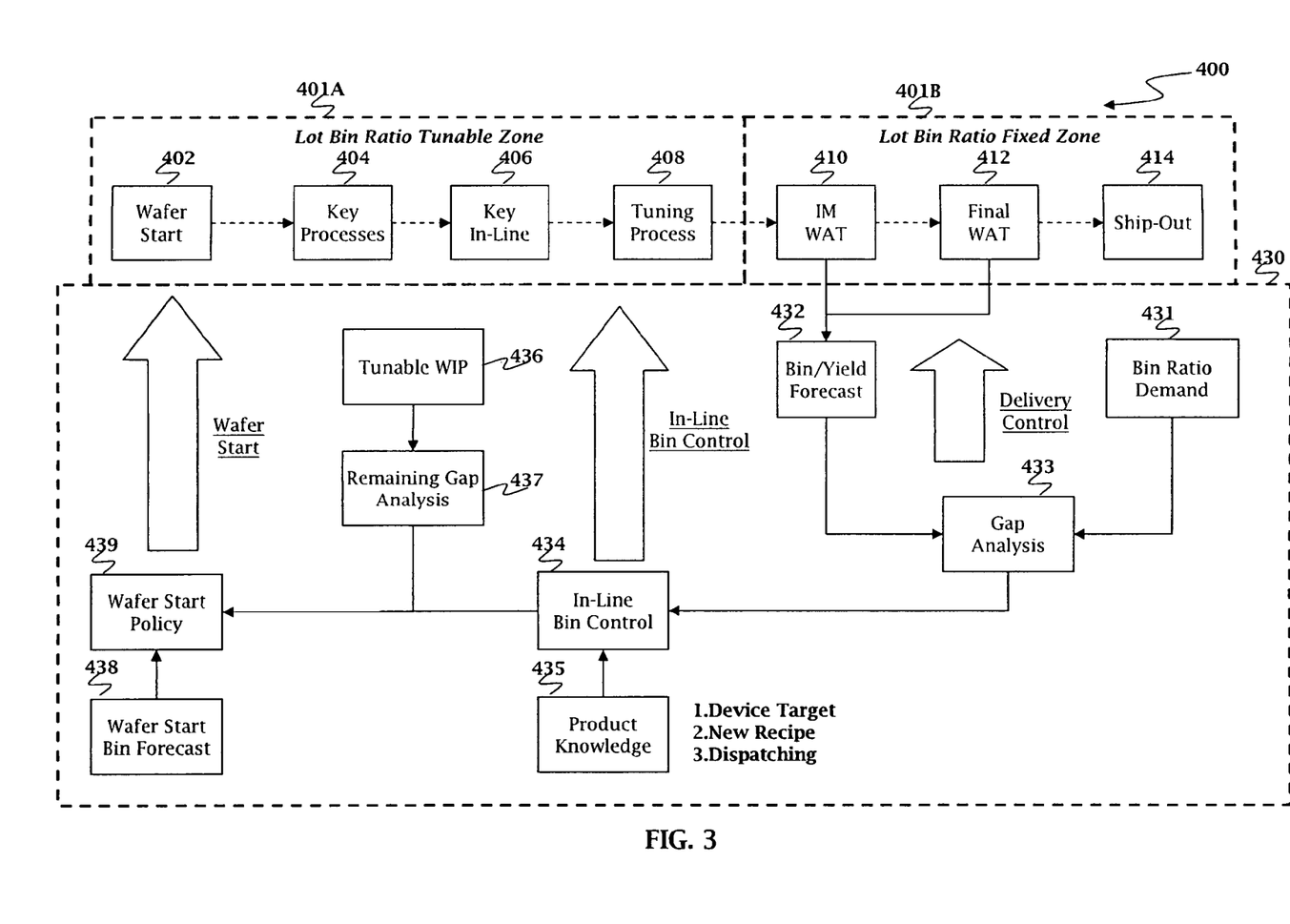
FIG. 3 is a flow chart illustrating a bin-based control mechanism for part of a semiconductor fabrication process flow according to various aspects of the present disclosure.

Referring to FIG. 3, a method 400 for providing bin-based control of a semiconductor manufacturing process flow is illustrated. The method 400 may be performed by the virtual fab system 300. The method 400 manages and controls a semiconductor manufacturing process flow, which fabricates a plurality of IC devices. Typically, this involves processing one or more wafer lots, each wafer lot including one or more wafers. For example, each wafer lot may comprise twenty-five wafers. The wafers are eventually cut into a plurality of dies, and each die contains a complete IC device (thus, a die may be referred to as an IC device and/or chip). The dies of a wafer lot may exhibit varying IC characteristics, so the dies are classified into various bin categories (i.e., BIN 1, BIN 2, BIN 3, . . . etc.). For example, IC devices classified as BIN 1 (i.e., bin category 1) may have experienced no failures and are thus regarded as good or passed devices, while IC devices classified as BIN 3 (i.e., bin category 3) are regarded as defective devices. Other bin categories could accommodate failures due to voltage or current being outside an acceptable range, open/short failures, or differing memory access times. The bin categories may be related to a yield requirement of the devices, electrical characteristics, or other characteristics of the IC devices. In another example, IC devices classified as BIN 1 may exhibit a saturation current between A and B, IC devices classified as BIN 2 may exhibit a saturation current between B and C, and IC devices classified as BIN 3 may exhibit a saturation current between C and D. In yet another example, IC devices classified as BIN 1 may exhibit a high saturation current and low threshold voltage, IC devices classified as BIN 2 may exhibit a low saturation current and low threshold voltage, and IC devices classified as BIN 3 may exhibit a high saturation current and high threshold voltage. It is understood that any number of bin categories and bin numbering systems may be employed depending on the IC devices manufactured and the nature of the IC devices to be tested.

Each wafer lot may be characterized by a bin ratio, which represents the ratio and/or percentage of the lot exhibiting IC characteristics associated with each bin category. For example, if there are three bin categories, the bin ratio (BIN 1:BIN 2:BIN 3) of a wafer lot may be 2:1:1. In other words, 50% of the dies in the wafer lot will exhibit IC characteristics associated with BIN 1, 25% of the dies in the wafer lot will exhibit IC characteristics associated with BIN 2, and 25% of the dies in the wafer lot will exhibit IC characteristics associated with BIN 3. The bin ratio may be determined based on the particular processing recipes utilized to process the wafer lot. Typically, the bin ratio is determined after the wafer lot has been processed into the individual dies and subjected to testing.

A customer often specifies particular IC characteristics when ordering IC devices. So, IC devices in BIN 1 may exhibit IC characteristics specified by one customer, IC devices in BIN 2 may exhibit IC characteristics specified by another customer, etc. Currently, bin categories are controlled and modified after manufacturing and final testing of each IC device. Accordingly, if a customer orders IC devices having the IC characteristics of BIN 1, the number of IC devices in BIN 1 is checked. If BIN 1 does not contain enough IC devices to fulfill the customer's order, then the manufacturing system needs to start a new wafer lot for processing, specifying the processing recipes and/or device targets to ensure a sufficient number of BIN 1 IC devices are manufactured to fulfill the customer's order. This takes a longer than desirable time (e.g., long cycle time, sometimes one to two months). In some instances, BIN 1 devices are currently processing, which will fulfill the customer's order, but the production schedule cannot be easily changed to ensure that the currently processing BIN 1 devices are ready by the customer's order date. Further, the demand for each bin category is constantly changing based on the varying IC characteristics desired by customers. Current semiconductor manufacturing systems lack the ability to effectively control bin category quantities and dynamically meet customer bin demand. This especially poses a problem when urgent delivery requests are received.

Accordingly, the present embodiments provide a bin-based control method to fulfill bin order business. Referring again to FIG. 3, the method 400 manages and controls the semiconductor manufacturing process flow 401. The semiconductor manufacturing process flow 401 can be classified into front-end-of-line (FEOL) processes and back-end-of-line (BEOL) processes. The FEOL processes include operations performed on a wafer lot up to a first metallization layer process. In the present embodiment, the FEOL processes comprise a wafer start 402, key processes 404, key in-line measurements 406, and tuning processes 408. The BEOL processes include operations performed on a wafer lot following the first metallization layer process until ship-out and delivery to a customer. In the present embodiment, the BEOL processes comprise an intermediary wafer assessment testing (IM WAT) 410, a final wafer assessment testing (WAT) 412, and ship-out/delivery processes 414.

Each wafer lot goes through the semiconductor manufacturing process flow 401 to produce a plurality of IC devices. The process flow 401 is further classified into a lot bin ratio tunable zone 401A and a lot bin ratio fixed zone 401B. The lot bin ratio tunable zone 401A represents a portion of the process flow where processes can be dynamically tuned to modify the characteristics of the IC devices being manufactured (i.e., during the FEOL processes). The lot bin ratio fixed zone 401B represents a portion of the process flow where the characteristics of the IC devices are essentially fixed (i.e., during the BEOL processes), thus, the resulting lot bin ratio is fixed. In both the lot bin ratio tunable, fixed zones 401A, 401B, a process schedule of a wafer lot may be modified. For example, the priority of a wafer lot may be modified at any time during the process flow 401.

At the wafer start 402, a wafer lot begins a processing sequence associated with key processes 404 and tuning processes 408. The processing sequence may be determined by defining a device target, such as a desired IC characteristic, and may include one or more processing recipes. The wafer lot is subjected to one or more key processes 404. The key processes include, for example, formation of one or more gate structures on the wafers in the wafer lot. After each key process, a key in-line measurement process 406 may be performed to evaluate the IC characteristics. The key in-line measurement process 406 may utilize a metrology tool (e.g., metrology tool 308). In some embodiments, the key-in line measurement process 406 may be performed sporadically. After the key processes 404 are performed, the wafer lot is subjected to one or more tuning processes 408. The tuning processes 408 may be utilized to tune the characteristics of the IC devices. For example, a processing recipe for an ion implantation process may be determined to achieve IC devices having a desired characteristic, such as a particular saturation current and/or threshold voltage. In-line measurements may also be performed after one or more of the tuning processes 408.

After the tuning processes 408 are performed, the lot bin ratio of the wafer lot reaches a fixed zone. The wafer lot is then subjected to one or more IM WATs 410 and/or final WATs 412. The IM WATs 410 are performed while one or more metallization layers are processed on the wafer. The IM WATs 410 provide an earlier indication of the IC characteristics exhibited by the wafer lot. The final WATs 412 are performed when wafer lot processing is complete. The wafer lot may then be divided into the plurality of IC devices, and the IC devices may be assigned to various ship-out and/or storage locations at ship-out/delivery process 414.

The present embodiment ensures that the shipped out IC devices fulfill customer demand. More particularly, a bin-based control method 430 dynamically meets customer bin demand by controlling and managing the semiconductor manufacturing process flow 401. The bin-based control method 430 may be implemented by the bin-based control system 329 including delivery control 329A, in-line control 329B, and wafer-in control 329C. The delivery control 329A can provide delivery control, the in-line bin control 329B can provide in-line bin control, and the wafer-in control 329C can provide wafer-in (or wafer start) control of the semiconductor manufacturing process flow 401 as illustrated in FIG. 3. It is understood that bin-based control system 329 may utilize the delivery control, in-line bin control, and/or wafer-in control individually or in combination.

The bin-based control method 430, utilizing the delivery control, in-line bin control, and/or wafer-in control, determines a required bin quantity, an actual bin quantity, and a projected bin quantity. The required bin quantity is associated with customer demand, for example, a number of IC devices per bin category to fulfill customer demand and/or a bin ratio required to fulfill customer bin demand. The actual bin quantity is associated with the actual quantities of IC devices associated with each bin category that are ready to be delivered (i.e., deliverable bin quantities) and/or a deliverable bin ratio associated with the deliverable bin quantities. The projected bin quantity includes a forecasted bin-die quantity per lot being processed, which may include a forecasted bin-die quantity per BEOL lot and/or a forecasted bin-die quantity per FEOL lot. The projected bin quantity is further associated with a forecasted bin ratio for each wafer lot being processed. The required bin quantity, actual bin quantity, and projected bin quantity are further described below with respect to the delivery control, in-line bin control, and wafer-in control.

Figure 4:
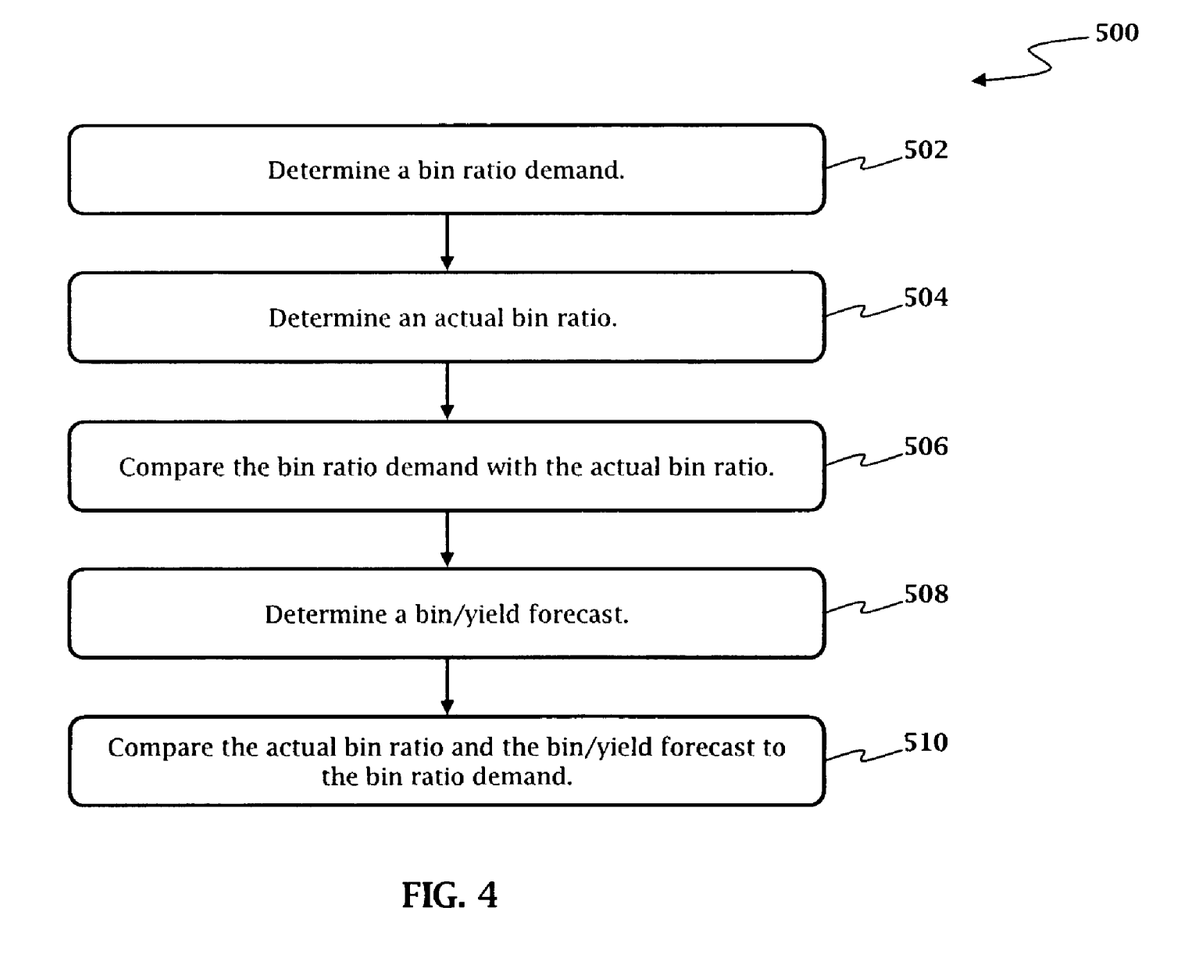
FIGS. 4-5 are flow charts of various methods for providing bin-based control according to various aspects of the present disclosure.

The delivery control is associated with the lot bin ratio fixed zone 401B and/or BEOL processes. The delivery control may be utilized to modify process schedules of various wafer lots to fulfill customer bin demand. In the present embodiment, the delivery control is associated with a bin ratio demand 431 and a bin/yield forecast 432. FIG. 4 illustrates a method 500 for delivery control. At steps 502 and 504, the bin ratio demand 431 and an actual bin ratio is determined. The bin ratio demand 431 represents a bin ratio associated with customer orders, which may also be referred to as a required bin quantity. For example, at one point in time, customer orders (or customer demand) may be associated with a 2:1:1 bin ratio, where customer demand requires 50% of BIN 1 IC devices, 25% of BIN 2 IC devices, and 25% of BIN 3 IC devices. The bin ratio demand 431 may further include a delivery date associated with each customer order. The actual bin ratio represents the actual quantities of IC devices associated with each bin category that are ready to be delivered, which is also referred to as an actual bin quantity/ratio and/or deliverable bin quantity/ratio.

At step 506, the bin ratio demand 431 is compared to the actual bin ratio. If the actual bin ratio satisfies the bin ratio demand 431, then processing continues according to a pre-determined processing schedule. If the actual bin ratio fails to satisfy the bin ratio demand 431, then the delivery control evaluates bin ratios of wafer lots in the BEOL processes to determine if the bin ratios associated with the BEOL wafer lots (e.g., projected bin quantity/ratio for BEOL wafer lots) combined with the actual bin ratio (e.g., actual bin quantity) will satisfy the bin ratio demand 431 (e.g., required bin quantity). The bin ratios (projected bin ratio) associated with the BEOL wafer lots are evaluated by considering the bin/yield forecast 432. At step 508, the bin/yield forecast 432 is determined, which provides a bin-die quantity per BEOL lot. The bin/yield forecast 432 predicts how many IC devices in the BEOL processes will fall within each bin category. A bin ratio report is generated, and the bin/yield forecast is then determined based on the bin ratio report. The generated bin ratio report provides bin ratios for wafer lots in the lot bin ratio fixed zone 401B, and thus, may be referred to as a BEOL bin ratio report. The report essentially provides bin ratios for the wafer lots in IM WATs 410 and final WATs 412. Based on the BEOL ratio report, the bin-die quantity per BEOL lot may be determined by:

$$\text{Bin-Die Quantity Per } BEOL \text{ Lot} = $$
$$\text{Wafer Quantity} \times \text{Bin Ratio} \times \text{Gross Die} \times CP \text{ Yield}$$

where wafer quantity is the number of wafers per lot, bin ratio is the percentage of the wafer lot that is associated with a particular bin category, gross die is the number of dies per wafer, and CP yield is the percentage of functioning dies or chips per wafer lot.

At step 510, the actual bin ratio and bin/yield forecast 432 are compared to the bin ratio demand 431. Such comparison is a gap analysis 433. The gap analysis 433 determines whether a gap exists between the confirmed (or required), bin ratio demand 431 and available bin quantities (which can include the actual bin quantity (i.e., dies ready for ship-out), the forecasted bin-die quantity per BEOL lot (projected bin quantity for BEOL lots), and/or a forecasted bin-die quantity per FEOL lot (projected bin quantity for FEOL lots)).

If the combined actual bin ratio and bin/yield forecast 432 meet the bin ratio demand 431, processing can continue according to the pre-determined processing schedule. Based on the bin/yield forecast 432, the delivery control can assign BEOL lots to ship-out for a specific customer's order. In some instances, though the wafer lots in the BEOL processes will fulfill the bin order quantity, the wafer lots in the BEOL processes may not be ready in time for delivery. So, in the present embodiment, the gap analysis 433 also considers order deadlines, and determines whether to modify processing schedules of particular wafer lots in order to meet the bin demand ratio 431. The gap analysis may consider the required cycle time for a particular BEOL wafer lot that is forecasted to yield the bin ratio to fulfill the bin ratio demand. The required cycle time may be based on a number of remaining layers to be processed. The delivery control can change the cycle time from a normal cycle time to a hot run and/or super hot run cycle time to ensure that the BEOL wafer lot is ready in time. Further, the delivery control can modify the processing schedule of a wafer lot to ensure that bin ratio demand 431 is timely satisfied. For example, the delivery control may direct a production priority change for a BEOL wafer lot to speed up its completion. In some embodiments, the delivery control further communicates with the in-line bin control and the wafer-in control.

The in-line bin control is associated with the lot bin ratio tunable zone 401A. The in-line bin control provides a mechanism to change and/or modify a deliverable bin ratio of a wafer lot. The in-line bin control may be utilized to modify process schedules, modify device targets, modify processing recipes, and/or modify dispatching schedules of various FEOL wafer lots to fulfill customer bin demand. In the present embodiment, the in-line bin control includes in-line bin control 433 and product knowledge 434. The in-line bin control 434 considers a remaining gap after the delivery control gap analysis 433 to determine whether in-line bin ratio tuning is necessary. The product knowledge 435 includes device targets, processing recipes, dispatching rules, other suitable parameters, and/or combinations thereof. The in-line bin control provides in-line bin ratio tuning by changing a device target, a processing recipe, or a dispatching route of a wafer lot. For example, if a device target for a wafer lot is a low threshold voltage device, but high threshold voltage devices are needed to satisfy customer bin demand, the in-line bin control changes the device target for the wafer lot to yield high threshold voltage devices. The in-line bin control can communicate the new device target to the various tuning processes 408 and/or processing tools. In some embodiments, the in-line bin control communicates a new processing recipe for a wafer lot to the various tuning processes 408 and/or processing tools. In some embodiments, the in-line bin control dispatches a wafer lot to a specific processing tool to ensure that the wafer lot is tuned to a given bin ratio. The in-line bin control may further modify a processing schedule of a FEOL wafer lot to ensure that bin ratio demand 431 is timely satisfied. For example, the in-line bin control may direct a production priority change for a FEOL wafer lot to speed up its completion. The in-line bin control also considers the gap analysis 433. For example, if the actual bin ratio and the bin/yield forecast 432 fail to satisfy the bin ratio demand 431, then the in-line bin control dynamically tunes bin ratios of the FEOL wafer lots to eliminate any gap existing between customer bin demand and available bin quantities.

Figure 5:
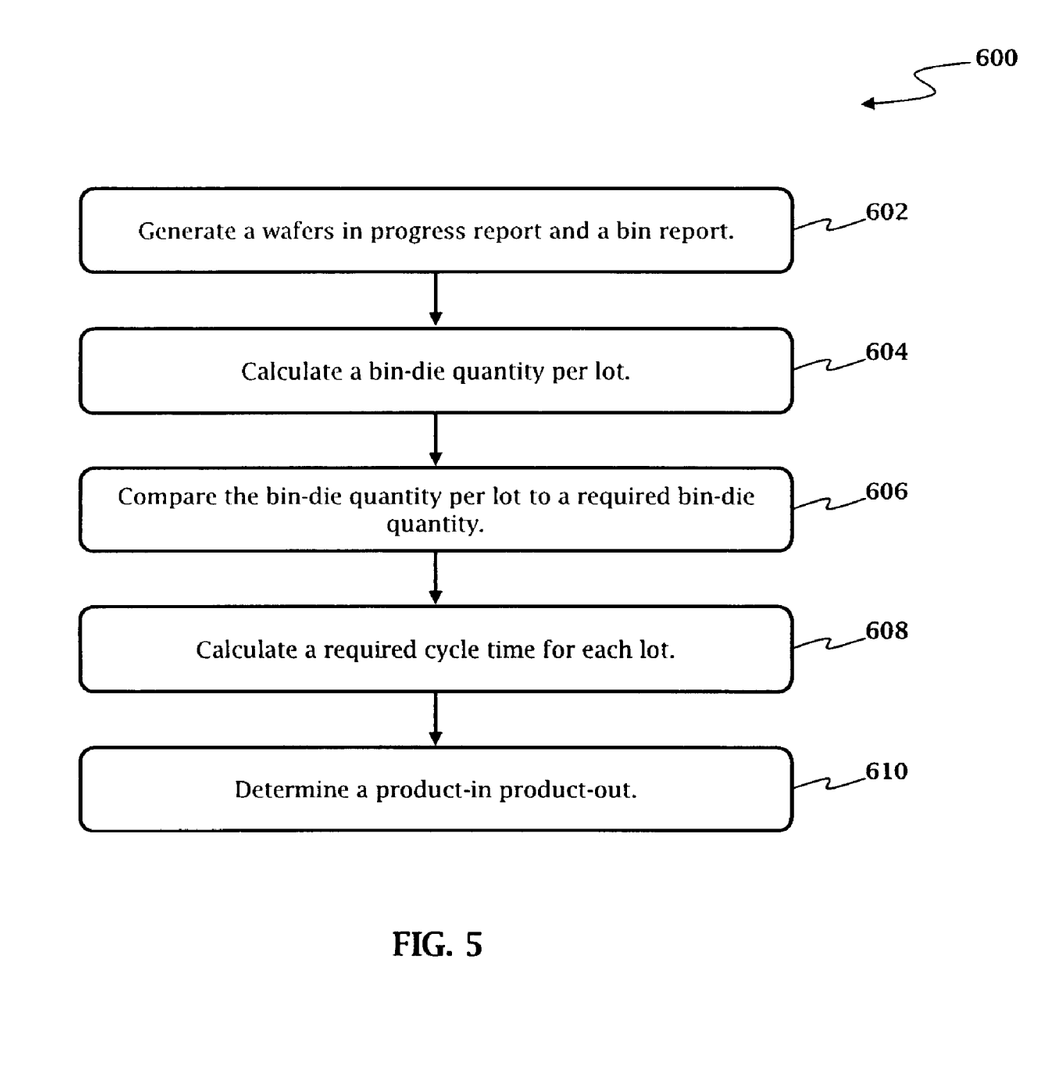

The wafer-in control is associated with the lot bin ratio tunable zone 401A. The wafer-in control considers tunable wafers in progress (WIP) 436, a remaining gap analysis 437, a wafer start bin forecast 438, and a wafer start policy 439. The wafer-in control determines the precise wafer start quantity to satisfy customer bin demand, while minimizing an excess and/or shortage of any one bin category. The wafer-in control determines the number of new wafer lots to start processing based on the remaining gap analysis 437. FIG. 5 provides an embodiment of a gap analysis method 600 that may be utilized in the remaining gap analysis 437. It is understood that gap analysis method 600 may further be utilized in gap analysis 433. At step 602, the gap analysis method 600 generates a wafers in progress (WIP) report including bin category information, such as a WIP report 700 illustrated in FIG. 6. The WIP report 700 provides a list of wafer lots being processed by a semiconductor manufacturing system, such as semiconductor manufacturing system 300. Each wafer lot may be associated with a lot ID number 702, a current processing stage 704, a wafer quantity 706, a remaining layer number 708, a gross die quantity 710, and a chip product yield 712. The current processing stage 704 identifies where in the semiconductor manufacturing process the wafer lot is, for example, a dielectric layer chemical mechanical polishing process, a metallization layer deposition, photolithography, and/or etching process, etc. The WIP report 700 may include wafer lots in the FEOL processes and/or wafer lots in the BEOL processes. The wafer quantity 706 identifies the number of wafers per lot (for example, twenty five wafers per lot). The remaining layer number 708 identifies the number of layers to be processed to complete processing of each wafer in the lot, for example, the lot may have four remaining layers to be processed on each wafer. The gross die quantity 710 indicates the number of die per wafer. The chip product yield 712 provides a number or percentage of functioning dies or chips per wafer that is expected. For example, a chip product yield of 80% indicates that 80% of the dies of each lot will yield a functioning IC device.

Figure 6:
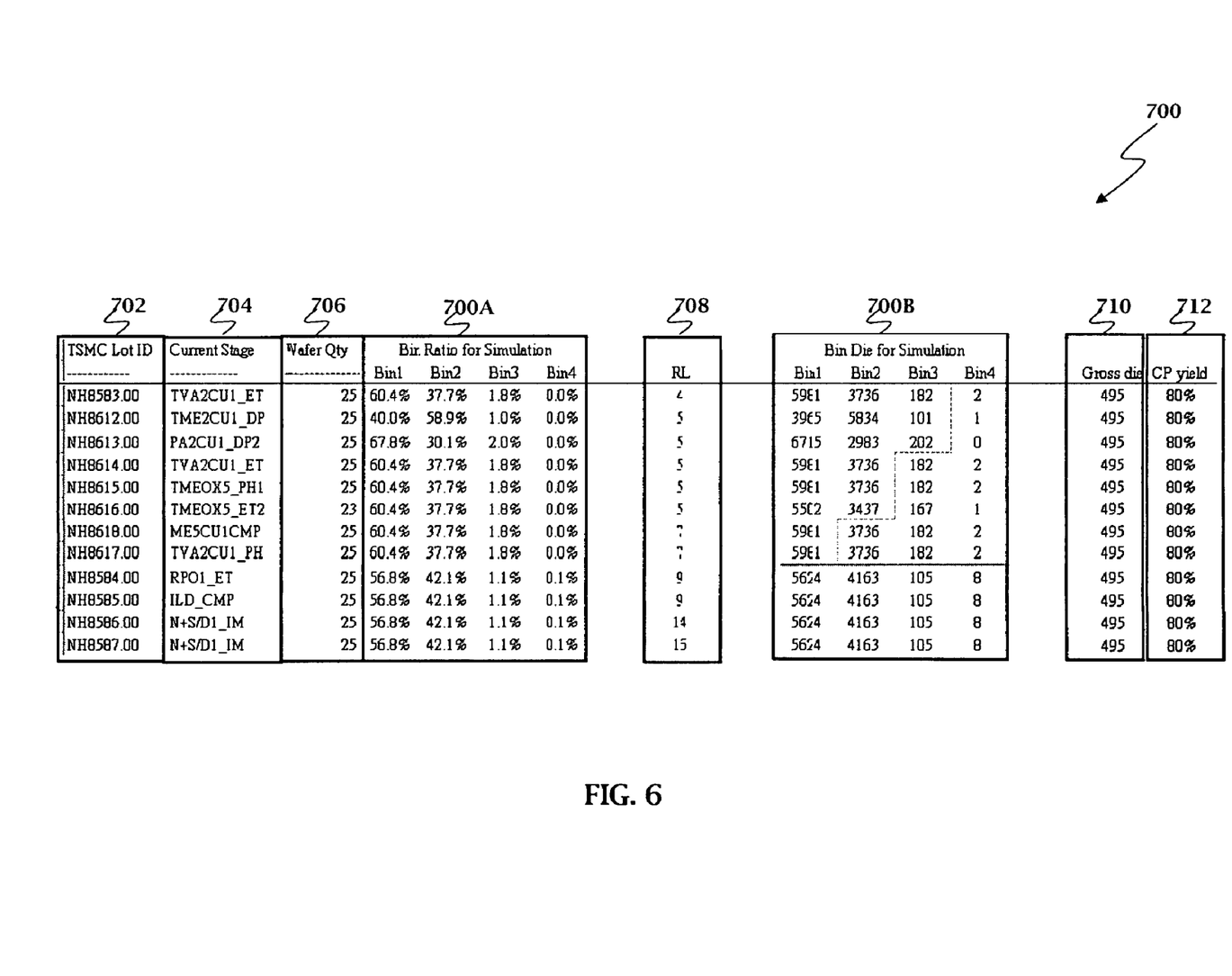
FIG. 6 is a wafers in progress report for a semiconductor fabrication system according to various aspects of the present disclosure.

The WIP report 700 may further be associated with a lot-based bin forecast report including a forecasted lot bin ratio 700A for each wafer lot in progress and a forecasted bin-die quantity per lot 700B, which may be collectively referred to as a lot-based bin forecast report 700. The lot-based bin forecast report 700 predicts how many IC devices will be classified in each bin category when completed (i.e., projected bin quantities). The lot-based bin forecast report 700 may be determined by a lot-based bin forecast system, which may be controlled by a product engineer, such as engineer 206. The forecasted lot bin ratio 700A for each wafer lot is based on a variety of parameters. For example, the forecasted lot bin ratio 700A may be determined based on device targets specified for a lot, processing recipes utilized to manufacture the wafers of a lot, in-line metrology data, such as key-in line measurements 406 that are obtained after a lot is subjected to key processes 404 and/or tuning processes 408, circuit design information, yield learning curves, any other suitable parameters, and/or combinations thereof. For purposes of illustration, a first wafer lot (Lot ID NH8583.00) of the WIP report 700 will be considered. For the first wafer lot, the forecasted lot bin ratio 700A indicates that 60.4% of the first lot will exhibit BIN 1 characteristics, 37.7% of the first lot will exhibit BIN 2 characteristics, 1.8% of the first lot will exhibit BIN 3 characteristics, and 0.0% of the first lot will exhibit BIN 4 characteristics.

At step 604, a bin-die quantity per lot is determined. The bin-die quantity per lot includes the forecasted bin-die quantity per BEOL lot and the forecasted bin-die quantity per FEOL lot, which may also be referred to as projected bin quantities. The forecasted bin-die quantity per BEOL lot indicates the number of dies associated with each bin category after intermediary and final WATs (which is determined by the bin/yield forecast 432 discussed above). The forecasted bin-die quantity per FEOL lot indicates the number of dies being processed that will exhibit characteristics of a particular bin category. In the present embodiment, the bin-die quantity per FEOL lot is based on the WIP report 700 and the forecasted lot bin ratio 700A, and it is illustrated in the lot-based bin forecast report as the forecasted bin-die quantity per FEOL lot 700B. The forecasted bin-die quantity per FEOL lot may be determined by:

$$\text{Bin-Die Quantity Per } FEOL \text{ Lot} =$$
$$\text{Wafer Quantity} \times \text{Bin Ratio} \times \text{Gross Die} \times CP \text{ Yield}$$

Considering the first wafer lot, for example, the forecasted bin-die quantity for the first lot indicates that 5,981 dies will exhibit BIN 1 characteristics, 3,736 dies will exhibit BIN 2 characteristics, 182 dies will exhibit BIN 3 characteristics, and 2 dies will exhibit BIN 4 characteristics.

At step 606, the bin-die quantity per lot is compared to a required bin-die quantity. The required bin-die quantity is the bin ratio demand 431, the bin ratio associated with customer orders/demand. The bin-die quantity per lot includes the projected bin-die quantity per lot (e.g., bin-die quantity per FEOL lot and bin-die quantity per BEOL lot) and actual, deliverable bin-die quantity per lot. The order dates of the required bin-die quantity is also considered. At step 608, a required cycle time (CT) is then calculated. The required CT is calculated based on the remaining layer number, the remaining layers to be processed for each wafer lot. For example, each remaining layer may take approximately two days to process, so a lot having five remaining layers may take approximately 10 days to complete. The required CT may be calculated for the FEOL and/or BEOL wafer lots to determine whether customer bin ratio demand 431 will be timely satisfied.

From steps 602 through 608, it is determined whether a gap exists between the bin ratio demand 431 and available bin ratio quantities, which include deliverable, FEOL, and BEOL wafer lots. The gap further considers the delivery dates, order dates, etc. to determine whether a time gap exists. If no gap (in time and quantity) exists, then the bin ratio demand 431 will be met and processing may continue according to the predetermined processing schedule. If a gap exists, then at step 610, the bin-based control system determines a product-in product out scheme based on the gap, including required cycle times of currently processing wafer lots.

Once the remaining gap analysis 437 determines the remaining gap, the product-in is determined by the wafer-in control. The wafer-in control considers the wafer start bin forecast 438 to provide a wafer start policy 439. The wafer start bin forecast 438 predicts a bin ratio for a wafer lot beginning processing, which may be based on circuit design and yield learning curves. From the wafer start bin forecast 432, the wafer-in control determines the wafer start policy 439. The wafer start policy 439 may determine the number of wafer lots to start in order to meet customer bin demand 431 considering any suitable factor, including the factors discussed herein. The starting wafer lot quantity fills the remaining gap so that customer bin demand 431 will be timely satisfied.

Figure 7:
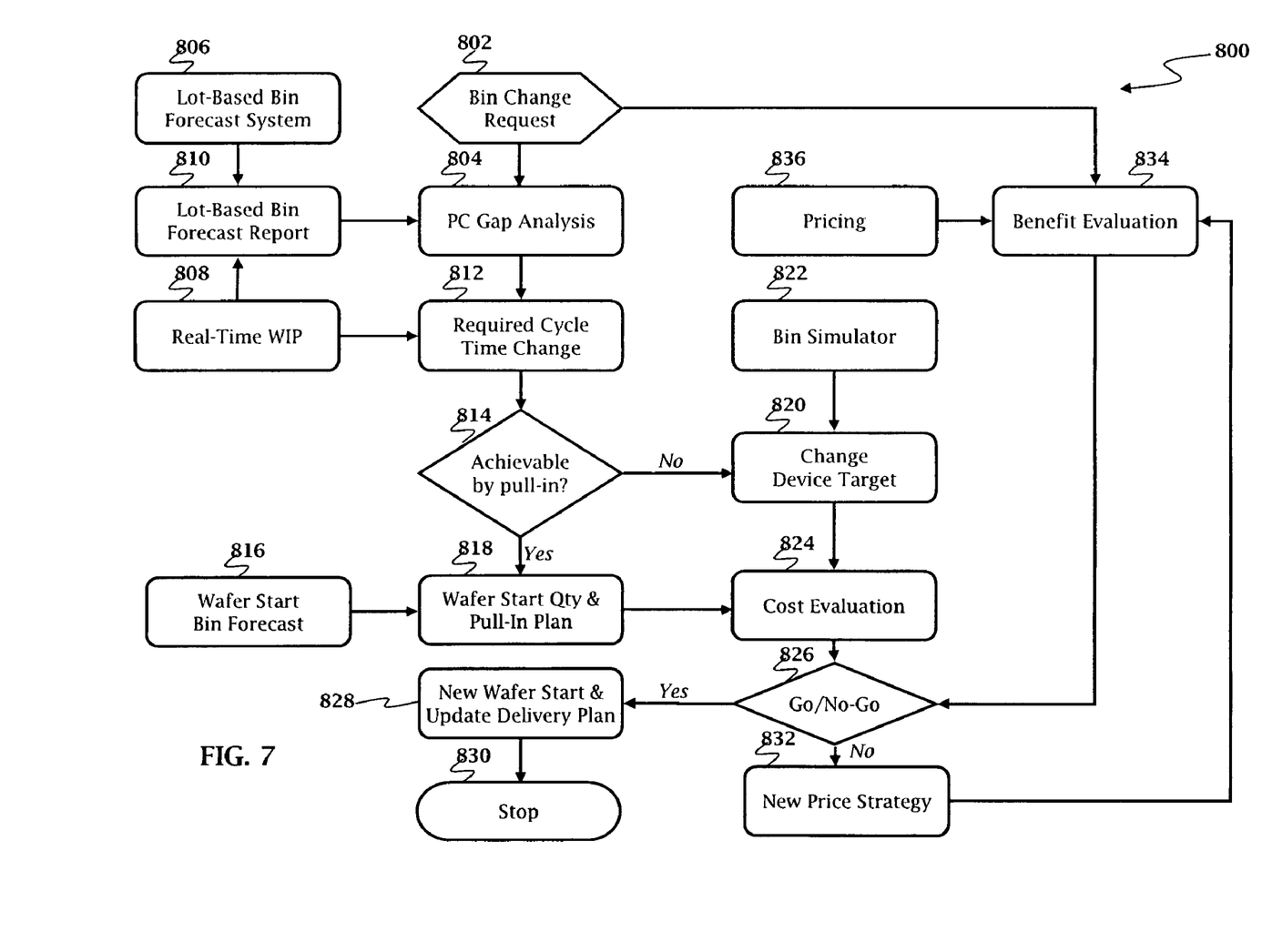
FIG. 7 is a flow chart of a bin-based control flow according to various aspects of the present disclosure.

FIG. 7 illustrates a bin-based control working flow 800 that may be implemented by the bin-based control system. The bin-based control working flow 800 may utilize the delivery control, in-line bin control, and wafer-in control discussed above. The bin-based control working flow 800 can begin with a bin change request 802. The bin change request 802 occurs when a customer requests a bin ratio change and/or completed wafer lots yield changes causing a bin shortage. When the bin change request occurs, a gap analysis 804 similar to the gap analysis 433 is performed. The gap analysis 804 utilizes a lot-based bin forecast system 806 and real-time wafers in progress report 808, which generates a lot-based bin forecast report 810.

From the lot-based bin forecast report 810, a required cycle time change is made 812 if the gap analysis 804 reveals a time or quantity gap. If the gap analysis 804 reveals a gap even after required cycle time changes are made 812, it is determined where eliminating the gap is achievable by pulling-in new wafer lots for processing 814. If yes, then a wafer start bin forecast 816 is utilized to determine a wafer start quantity and pull-in plan 818. If no, then a device target for a wafer lot in processing is changed 820. The device target 820 may be changed based on a bin simulator 822.

The wafer start quantity and pull-in plan 818 and/or device target change 820 then undergo a cost evaluation 824, where it is determined whether the cost is satisfactory/acceptable 826. If the cost evaluation is acceptable, the new wafer lots determined in the wafer start quantity and pull-in plan 818 begin processing and/or the delivery control or in-line bin control update a delivery plan 828 and processing continues 830. The in-line bin control may modify a processing recipe to tune a FEOL processing lot to exhibit the device target change 820. If the cost evaluation is not acceptable, then a new price strategy 832 may be necessary. The new price strategy 832 can be based on a benefit evaluation 834 that considers pricing 836.

In summary, a bin-based control mechanism is provided. The bin-based control mechanism includes a bin forecasting method based on wafer assessment testing, routing and/or dispatching instructions, in-line metrology measurements, wafer start bin forecasting, etc. The bin forecasting methods provide delivery control (e.g., delivery control 329A), in-line bin control (e.g., in-line bin control 329B), and wafer start control (e.g., wafer-in control 329C) to dynamically satisfy customer bin demand.

The present disclosure can take the form of an entirely hardware embodiment, an entirely software embodiment, or an embodiment containing both hardware and software elements. Furthermore, embodiments of the present disclosure can take the form of a computer program product accessible from a tangible computer-usable or computer-readable medium providing program code for use by or in connection with a computer or any instruction execution system. For the purposes of this description, a tangible computer-usable or computer-readable medium can be any apparatus that can contain, store, communicate, propagate, or transport the program for use by or in connection with the instruction execution system, apparatus, or device. The medium can be an electronic, magnetic, optical, electromagnetic, infrared, a semiconductor system (or apparatus or device), or a propagation medium.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method for providing bin-based control when manufacturing integrated circuit devices, wherein a bin is associated with one or more characteristics exhibited by an integrated circuit device, the method comprising:
performing a plurality of processes on a plurality of wafer lots;
determining a required bin quantity, an actual bin quantity, and a projected bin quantity;
comparing the determined required bin quantity with the determined actual bin quantity and determined projected bin quantity; and
modifying at least one of the plurality of processes on the plurality of wafer lots if the determined actual bin quantity and determined projected bin quantity fail to satisfy the determined required bin quantity.

2. The method of claim 1 wherein the required bin quantity is a bin ratio associated with customer demand, the actual bin quantity is a bin ratio associated with completed wafer lots, and the projected bin quantity is a bin ratio associated with processing wafer lots.

3. The method of claim 1 wherein determining a projected bin quantity comprises determining a forecasted bin quantity based on wafer assessment testing, routing, and in-line metrology.

4. The method of claim 1 wherein determining a projected bin quantity comprises predicting a bin-die quantity per back-end-of-line processing (BEOL) lot and a forecasted bin-die quantity per front-end-of-line processing (FEOL) lot.

5. The method of claim 1 wherein comparing the determined required bin quantity with the determined actual bin quantity and determined projected bin quantity comprises performing a gap analysis.

6. The method of claim 5 wherein performing the gap analysis comprises:
   generating a wafer lots in progress (WIP) report including a bin report;
   calculating a bin-die quantity per lot based on the WIP report including the bin report;
   comparing the bin-die quantity per lot to the required bin quantity;
   calculating a required cycle time for the WIP; and
   determining a product-in product-out scheme based on the required cycle time for the WIP.

7. The method of claim 1 wherein modifying at least one of the plurality of processes on the plurality of wafer lots comprises one of modifying a process schedule, modifying a device target, modifying a processing recipe, modifying a dispatching route, or combinations thereof.

8. The method of claim 1 further comprising designating a wafer lot quantity to start processing if the determined actual bin quantity and determined projected bin quantity fail to satisfy the determined required bin quantity.

9. The method of claim 8 wherein designating a wafer lot quantity to start comprises determining a wafer start bin forecast.

10. A method for fabricating integrated circuit devices, the method comprising:
    determining a required bin quantity including a required delivery date and a deliverable bin quantity;
    calculating a bin quantity per processing lot if a first gap exists between the deliverable bin quantity and the required bin quantity;
    designating at least one of the processing lots for ship-out to fill the first gap;
    determining a required cycle time for the designated processing lot; and
    modifying a processing parameter of the designated processing lot if the required cycle time does not meet the required delivery date.

11. The method of claim 10 wherein calculating a bin quantity per processing lot if a first gap exists between the deliverable bin quantity and the required bin quantity comprises:
    calculating a bin quantity per back-end-of-line (BEOL) processing lot;
    designating at least one of the BEOL processing lots for ship-out to fill the first gap;
    calculating a bin quantity per front-end-of-line (FEOL) processing lot if a second gap exists between the deliverable bin quantity and the designated BEOL lots and the required bin quantity; and
    designating at least one of the FEOL processing lots for ship-out to fill the second gap.

12. The method of claim 11 wherein designating at least one of the FEOL processing lots for ship-out to fill the second gap comprises performing an in-line bin ratio tuning process on the designated FEOL processing lot.

13. The method of claim 12 wherein performing the in-line bin ratio tuning process comprises modifying a device target for the designated FEOL processing lot.

14. The method of claim 12 wherein performing the in-line bin ratio tuning process comprises modifying a processing recipe for the designated FEOL processing lot.

15. The method of claim 12 wherein performing the in-line bin ratio tuning process comprises dispatching the designated FEOL processing lot along a modified processing path.

16. The method of claim 11 wherein calculating a bin quantity per processing lot if a first gap exists between the deliverable bin quantity and the required bin quantity further comprises determining a wafer start policy if a third gap exists between the required bin quantity and the deliverable bin quantity, designated BEOL lots, and designated FEOL lots.

17. The method of claim 16 wherein determining a wafer start policy comprises providing a wafer start bin forecast based on circuit design and yield learning curves.

18. The method of claim 16 wherein determining a wafer start policy comprises designating a wafer lot to start processing to fill the third gap.

19. A system for providing bin-based control in a semiconductor manufacturing environment in which a plurality of processes are performed on a plurality of wafer lots, the system comprising:
    a virtual fabrication system coupled to a network;
    a manufacturing execution system (MES) coupled to the network, wherein the MES comprises a bin-based control module configured to:
        determine a required bin quantity, an actual bin quantity, and a projected bin quantity;
        compare the determined required bin quantity with the determined actual bin quantity and determined projected bin quantity; and
        modify at least one of the plurality of processes on the plurality of wafer lots if the determined actual bin quantity and determined projected bin quantity fail to satisfy the determined required bin quantity.

20. The system of claim 19 wherein the bin-based control module comprises a delivery control module, an in-line bin control module, and a wafer start control module.

21. The system of claim 20 wherein the in-line bin control module is configured to provide in-line bin ratio tuning.

* * * * *